June 14, 1966 R. A. STAUFFER 3,256,464

PROCESS FOR OPERATING PLURAL SUPERCONDUCTIVE COILS

Filed May 13, 1963

*INVENTOR.*

*BY* ROBERT A. STAUFFER 3,256,464

PROCESS FOR OPERATING PLURAL SUPERCONDUCTIVE COILS

Robert A. Stauffer, Weston, Mass., assignor to National Research Corporation, Cambridge, Mass., a corporation of Massachusetts Filed May 13, 1963, Ser. No. 279,940
1 Claim. (Cl. 317—9)

The present invention relates to electromagnetic coils, and more particularly to such coils formed of superconducting material.

It is the principal object of the invention to provide an optimum method of operating plural superconductive coils, avoiding the problems demonstrated below.

Figure 1:
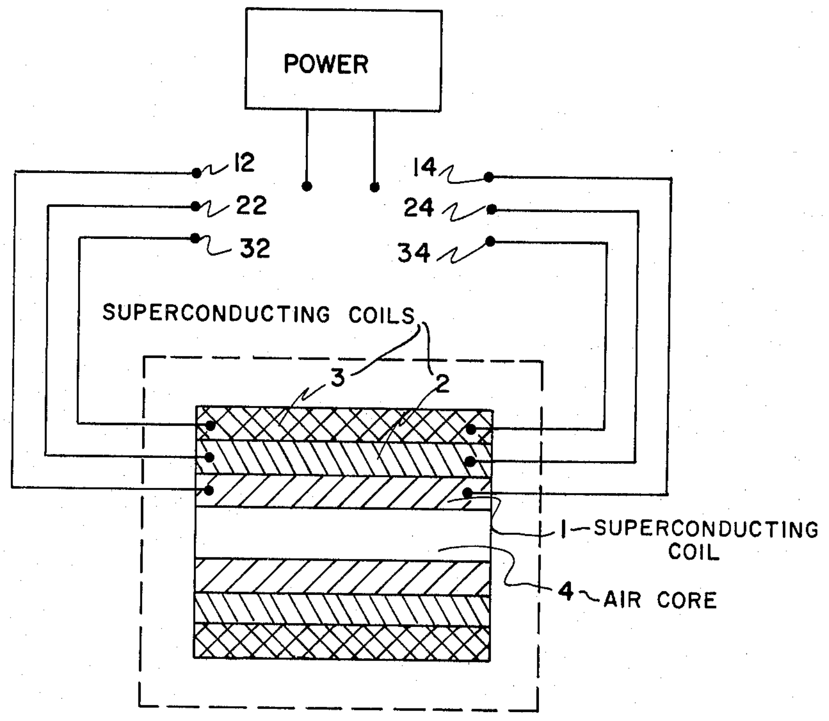
Figure 2:
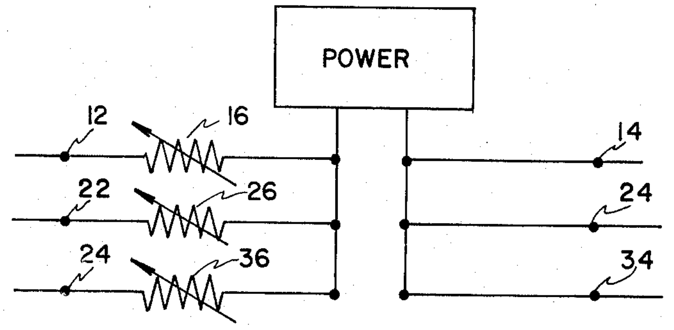

For a fuller understanding of the nature and objects of the invention, reference should be had to the following detailed description taken in connection with the accompanying drawings wherein:

FIG. 1 is a schematic diagram of three superconducting coils with power supply leads; and FIG. 2 is a schematic diagram of a modification of the power supply leads in accord with the invention.

The problem to be solved is demonstrated by the following experiment. Three coaxial superconducting coils were arranged as shown in FIG. 1 to produce a field in air core 4. The assembled coils were placed in a liquid helium bath 5.

Power was fed to coil 1, the innermost coil, via leads 12 and 14, to coil 2 via leads 22 and 24, and to coil 3, the outermost coil via leads 32 and 34. The coils were wound from niobium ribbon having a diffusion coating of $Nb_3Sn$ on a surface thereof. The range of operation of the coil was such that the niobium was quenched and current was carried without resistance by the $Nb_3Sn$ layers.

In a first run, the power was connected to the leads 12 and 14 to operate coil 1 and it carried 60 amperes without rsistance. Then, leads 12 and 14 were disconnected and leads 22 and 24 were connected to operate coil 2. Coil 2 carried 38 amperes and 36 amperes, without resistance, in two successive runs. The the power was connected to leads 12 and 24 and lead 14 was connected to lead 22 to operate coils 1 and 2 in series. They could only carry 18 amperes without resistance.

In another run, the power supply was connected to leads 12 and 14 and, in parallel, to leads 22 and 24 to operate coils 1 and 2 in parallel. With coil 2 carrying 32 amperes, without resistance, coil 1 could only carry 8 amperes without resistance. Then coils 2 and 3 were connected in series and power was supplied to those two coils in parallel with coil 1. With the two series coils carrying 27 amperes, without resistance, coil 1 could only carry 9 amperes without resistance.

After one coil goes normal its resistance heating will eventually cause the other coils to go normal.

In accordance with the present invention, this difficulty is avoided by placing variable resistances 16, 26, 36 in series with coils 1, 2, and 3, respectively. The value of resistance 16 is higher than that of resistance 26 and the value of resistance 26 is higher than that of resistance 36. By appropriate adjustments of these values, the currents in the respective coils are kept below their critical current values and continuous superconductive operation is assured. The desired values of resistance are in inverse ratio to the critical currents of the coils without the resistances. That is, the ratio $R2/R1$ should not be greater than $Ic1/Ic2$ where R1 is the resistance put in series with the coil which has exhibited critical current $Ic2$.

Since certain changes may be made in the above process without departing from the scope of the invention herein involved, it is intended that all matter contained in the above description, or shown in the accompanying drawing, shall be interpreted as illustrative and not in a limiting sense.

What is claimed is:

(a) An improvement in the apparatus of plural coaxial superconducting coils of niobium stannide, which coils are connected to a common power supply and are in parallel circuit relation to each other, wherein a first one of said coils is disposed in the magnetic field of a second one of said coils, whereby the first coil has a critical current Ic1 lower than the critical current Ic2 of the second coil, the ratio $Ic1/Ic2$ being less than about 0.5, the improvement comprising:

(b) first and second resistance elements in series with the first and second coils, respectively, and in parallel circuit relation to each other, and (c) the first and second resistance elements having the resistance values R1 and R2, respectively, and the said resistance values being such that the ratio $R2/R1$ is not greater than the above said ratio $Ic1/Ic2$.

References Cited by the Examiner

UNITED STATES PATENTS

| | | | |
|---|---|---|---|
| 3,088,040 | 4/1963 | Newhouse. | |
| 3,129,359 | 4/1964 | Kunzler. | |
| 3,176,195 | 3/1965 | Boom et al. | 317—123 |

SAMUEL BERNSTEIN, *Primary Examiner.*

R. V. LUPO, *Assistant Examiner.*